US011033876B2

(12) United States Patent
Lambert

(10) Patent No.: US 11,033,876 B2
(45) Date of Patent: Jun. 15, 2021

(54) STRUCTURED PACKING ELEMENT FORMED BY A FLAT PLATE PROVIDED WITH SLOTS AND RECESSES

(71) Applicant: AXENS, Rueil-Malmaison (FR)

(72) Inventor: Nicolas Lambert, Issy-les-Moulineaux (FR)

(73) Assignee: AXENS, Rueil-Malmaison (FR)

( * ) Notice: Subject to any disclaimer, the term of this patent is extended or adjusted under 35 U.S.C. 154(b) by 318 days.

(21) Appl. No.: 16/127,884

(22) Filed: Sep. 11, 2018

(65) Prior Publication Data

US 2019/0076816 A1 Mar. 14, 2019

(30) Foreign Application Priority Data

Sep. 12, 2017 (FR) ...................................... 1758.446

(51) Int. Cl.
*B01J 19/32* (2006.01)
*B01J 8/34* (2006.01)

(52) U.S. Cl.
CPC ................ *B01J 19/32* (2013.01); *B01J 8/34* (2013.01); *B01J 2219/328* (2013.01); *B01J 2219/32206* (2013.01); *B01J 2219/32227* (2013.01); *B01J 2219/32255* (2013.01); *B01J 2219/32275* (2013.01); *B01J 2219/32286* (2013.01); *B01J 2219/32296* (2013.01); *B01J 2219/32408* (2013.01); *B01J 2219/32466* (2013.01); *B01J 2219/3306* (2013.01)

(58) Field of Classification Search
CPC .... B01J 8/34; B01J 19/32; B01J 2219/32206; B01J 2219/32227; B01J 2219/32255; B01J 2219/32258; B01J 2219/32275; B01J 2219/32286; B01J 2219/32296; B01J 2219/32408; B01J 2219/32466; B01J 2219/328; B01J 2219/3306
USPC ....................................... 261/112.1, DIG. 72
See application file for complete search history.

(56) References Cited

U.S. PATENT DOCUMENTS

| 888,120 A | * | 5/1908 | Scherfenberg | |
| 2,042,127 A | * | 5/1936 | Sayles | F28F 25/087 261/112.1 |
| 2,612,359 A | * | 9/1952 | Simpson | F28C 1/10 261/112.1 |
| 2,661,197 A | * | 12/1953 | Norman | B01J 19/32 261/112.1 |

(Continued)

FOREIGN PATENT DOCUMENTS

| EP | 0719850 A1 | 7/1996 |
| FR | 346613 A | 2/1905 |

(Continued)

*Primary Examiner* — Charles S Bushey
(74) *Attorney, Agent, or Firm* — Fitch, Even, Tabin & Flannery, LLP

(57) ABSTRACT

A structured packing element has the shape of a rectangular flat plate, and is provided with slots and recesses. The slots are intended for assembly by interlocking the structured packing elements together in order to form the structured packing. The recesses are provided in order to form channels within the structured packing.
A packing structure can be obtained by assembling such packing elements. Such a packing can be used for an operation of bringing a gas and a catalyst into contact. A manufacturing process of such a structured packing is also disclosed.

20 Claims, 4 Drawing Sheets

(56) References Cited

U.S. PATENT DOCUMENTS

| | | | | |
|---|---|---|---|---|
| 2,836,405 | A * | 5/1958 | Hamon | F28F 25/087 |
| | | | | 261/112.1 |
| 3,227,429 | A * | 1/1966 | Renzi | F28F 25/085 |
| | | | | 261/112.1 |
| 3,340,341 | A * | 9/1967 | Bruder | B01J 19/32 |
| | | | | 264/248 |
| 4,107,241 | A * | 8/1978 | Braun | B01D 3/22 |
| | | | | 261/112.1 |
| 4,202,847 | A * | 5/1980 | Ernst | F28F 25/087 |
| | | | | 261/161 |
| 4,427,606 | A | 1/1984 | Chen et al. | |
| 4,557,876 | A * | 12/1985 | Nutter | B01J 19/32 |
| | | | | 261/112.1 |
| 4,744,928 | A | 5/1988 | Meier | |
| 5,326,503 | A * | 7/1994 | Iwashita | B01J 19/32 |
| | | | | 261/112.1 |
| 5,716,585 | A | 2/1998 | Senegas et al. | |
| 6,517,058 | B1 * | 2/2003 | Engh | F28F 25/087 |
| | | | | 261/112.1 |
| 9,389,009 | B2 * | 7/2016 | Olson, Jr. | F25C 1/246 |

FOREIGN PATENT DOCUMENTS

| | | | |
|---|---|---|---|
| FR | 2366859 | A1 | 5/1978 |
| JP | S52-40474 | A | 3/1977 |
| JP | S54-48681 | A | 4/1979 |
| JP | H07-251062 | A | 10/1995 |

\* cited by examiner

STRUCTURED PACKING ELEMENT FORMED BY A FLAT PLATE PROVIDED WITH SLOTS AND RECESSES

CROSS REFERENCE TO RELATED APPLICATIONS

Reference is made to French Patent Application No. 17/58.446 filed Sep. 12, 2017, to which priority is claimed and which is incorporated herein by reference in its entirety.

The present invention relates to the field of structured packing, used in particular for an operation of stripping hydrocarbons entrained or adsorbed on catalyst particles.

The invention can in particular relate to the field of cracking processes. The present invention can in particular be implemented in a fluid catalytic cracking (FCC) process for cracking heavy feedstocks such as vacuum residues or vacuum distillates, but also in FCCs treating lighter feedstocks. It can also be implemented in naphtha catalytic cracking (NCC) units or also deep catalytic cracking (DCC) or high severity fluid catalytic cracking (HS-FCC) units, or also in methanol to olefins (MTO) or in methanol to gasoline (MTG) conversion units.

More particularly, the present invention can be used in fluid catalytic cracking units, also called FCC units in the remainder of this description.

The FCC units can operate either with a single riser reactor or downflow reactor geared towards the production of gasoline, or with two reactors, a main reactor geared towards the production of gasoline and a secondary reactor geared towards the production of propylene.

In an FCC process, the hydrocarbons are brought into contact in the reactor with a finely divided catalyst. During the cracking reaction, hydrocarbons, some of which are partially cracked, are deposited on the catalyst. These more-or-less cracked hydrocarbons are generally called "coke". It is therefore necessary to transport the catalyst to one or more regenerators in order to continuously remove these hydrocarbons and thus regenerate the catalyst.

However, it is necessary, before sending spent catalyst to the regenerator, to remove beforehand all or part of the hydrocarbons which have penetrated the high porosity of the catalyst or which are adsorbed on its surface. This makes it possible to reduce and better control the temperature at the regenerator, and to improve the recovery of upgradable products originating from cracking. This operation is carried out in a stripper in which a gas, generally steam, is circulated in counter-current to the flow of catalyst. Said gas becomes loaded with gaseous hydrocarbons thus removed from the surface or from the porosity of the catalyst. The efficiency of this operation is increased by the addition of baffles or packing in the stripping zone.

The baffles or packing are generally arranged in the lower part of the stripper in the dense phase so as to reduce entrainments of solid particles towards the dilute phase.

Efficient stripping of the hydrocarbons and coke precursors present on the spent catalyst is essential, insofar as the feedstocks treated are increasingly heavy, which requires more severe cracking operating conditions and leads to the formation of more significant quantities of coke on the catalyst.

In a fluidized-bed catalytic unit, the packing arranged in the stripping zone has the advantage of ensuring a good distribution of the catalyst in the stripping zone and having a good efficiency of contact between the spent catalyst and the stripping fluid.

One of the difficulties encountered during the installation of a structured packing is the need to cut the different layers into sectors so as to be able to introduce them more easily into the stripping chambers. The structure is then reassembled inside the space, layer by layer. The initial assembly of the different sectors requires putting the elements constituting these sectors into position in order to weld them at each connection point. Thus, the structured packing currently requires time-consuming and complex assembly.

Patent application EP 0719850 describes an example of such a structured packing used in a stripping chamber. However, the packing structure described in this patent application has the drawbacks described above: time-consuming and complex assembly.

Moreover, the structured packing is also used for bringing fluids into contact, in particular in the fields of gas treatment, distillation, acid gas capture, dehydration or air separation. For these fields of use, the packing fulfils similar functions to the packing used for the stripping. For these uses, the packing also has to be simple and quick to assemble within the column.

In order to overcome these drawbacks, the present invention relates to a structured packing element having the shape of a rectangular flat plate, provided with slots and recesses. The slots are intended for assembly by interlocking the elements of structured packing together in order to form the structured packing, thus, the structured packing can be assembled by interlocking, which makes it possible to facilitate placing and holding the packing elements in position for welding, or even to eliminate welds. The recesses are provided in order to form channels within the structured packing, in order to facilitate the exchanges within the packing.

The present invention also relates to a packing structure obtained by assembling such packing elements, the use of such a packing for an operation of bringing a gas and a catalyst into contact, and a process for manufacturing such a structured packing.

THE DEVICE ACCORDING TO THE INVENTION

The present invention relates to a structured packing element having the shape of a substantially rectangular flat plate. Said packing element comprises at least two slots for interlocking two packing elements inclined with respect to one another, and at least two recesses for forming channels within the structured packing, said slots and said recesses being distributed over both lengths of said flat plate symmetrically with respect to the longitudinal axis of said flat plate.

According to an embodiment of the invention, said slots are substantially rectangular. According to an implementation, said slots have a height h substantially equal to the thickness e of said flat plate.

According to an aspect, said recesses are substantially triangular.

According to a characteristic, said recesses are arranged between two slots.

According to an embodiment, the length L of said flat plate is comprised between 25 and 100 cm, preferably between 45 and 55 cm.

According to an embodiment option, the width l of said flat plate is comprised between 3 and 15 cm, preferably between 5 and 10 cm.

According to an implementation, the thickness e of said flat plate is comprised between 2 and 10 mm, preferably between 4 and 8 mm.

Advantageously, the distance d between two consecutive slots is comprised between 1 and 50 cm, preferably between 10 and 30 cm.

The present invention also relates to a packing structure forming a volume comprising an arrangement of packing elements according to one of the preceding characteristics. Said arrangement comprises a first series of packing elements arranged in a first direction, and a second series of packing elements arranged in a second direction inclined with respect to said first direction, in such a way that the packing elements of said second series are interlocked in slots of the packing elements of said first series, and in such a way that the packing elements of said first series are interlocked in slots of the packing elements of said second series.

According to an embodiment of the invention, said packing elements of said first and second series are fixed together, preferably by welding, by bonding, by screwing or by bolting.

According to an implementation, said volume of structured packing is substantially in the shape of an angular portion of a cylinder.

According to an aspect, said volume of structured packing has a height H comprised between 10 and 200 cm, preferably between 15 and 150 cm.

According to a characteristic, the angle formed by the first direction and the second direction is comprised between 10 and 90°, preferably between 30 and 90°.

In addition, the invention relates to a use of a packing structure according to one of the preceding characteristics for bringing a gas into contact with a catalyst, in particular for a stripping operation of said catalyst.

Process for manufacturing a packing structure, in which the following steps are carried out:
 a) manufacturing a plurality of packing elements according to one of the preceding characteristics;
 b) constructing an arrangement of said packing elements by means of the following steps:
  i) positioning at least two packing elements of a first series of packing elements in a first direction;
  ii) interlocking at least two packing elements of a second series of packing elements in a second direction inclined with respect to said first direction within said slots of said packing elements of said first series;
  iii) interlocking at least two packing elements of a first series of packing elements in said first direction within said slots of said packing elements of said second series; and
  iv) repeating steps ii) and iii) in order to form the desired volume.

According to an embodiment of the invention, the manufacturing process comprises a step of fixing said packing elements, preferably by welding, by bonding, by screwing or by bolting.

According to an implementation, the manufacturing process comprises a step of cutting said volume of structured packing in order to form an angular portion of a cylinder.

BRIEF PRESENTATION OF THE FIGURES

Other characteristics and advantages of the device and the process according to the invention will become apparent on reading the following description of non-limitative embodiment examples, with reference to the attached figures which are described below.

FIG. 1 shows a stripper according to an embodiment of the invention. FIG. 1a is a general view of a stripper including a packing structure according to the invention. FIG. 1b shows the structured packing of the stripper of FIG. 1.

DETAILED DESCRIPTION OF THE INVENTION

Packing Element

Figure 1:
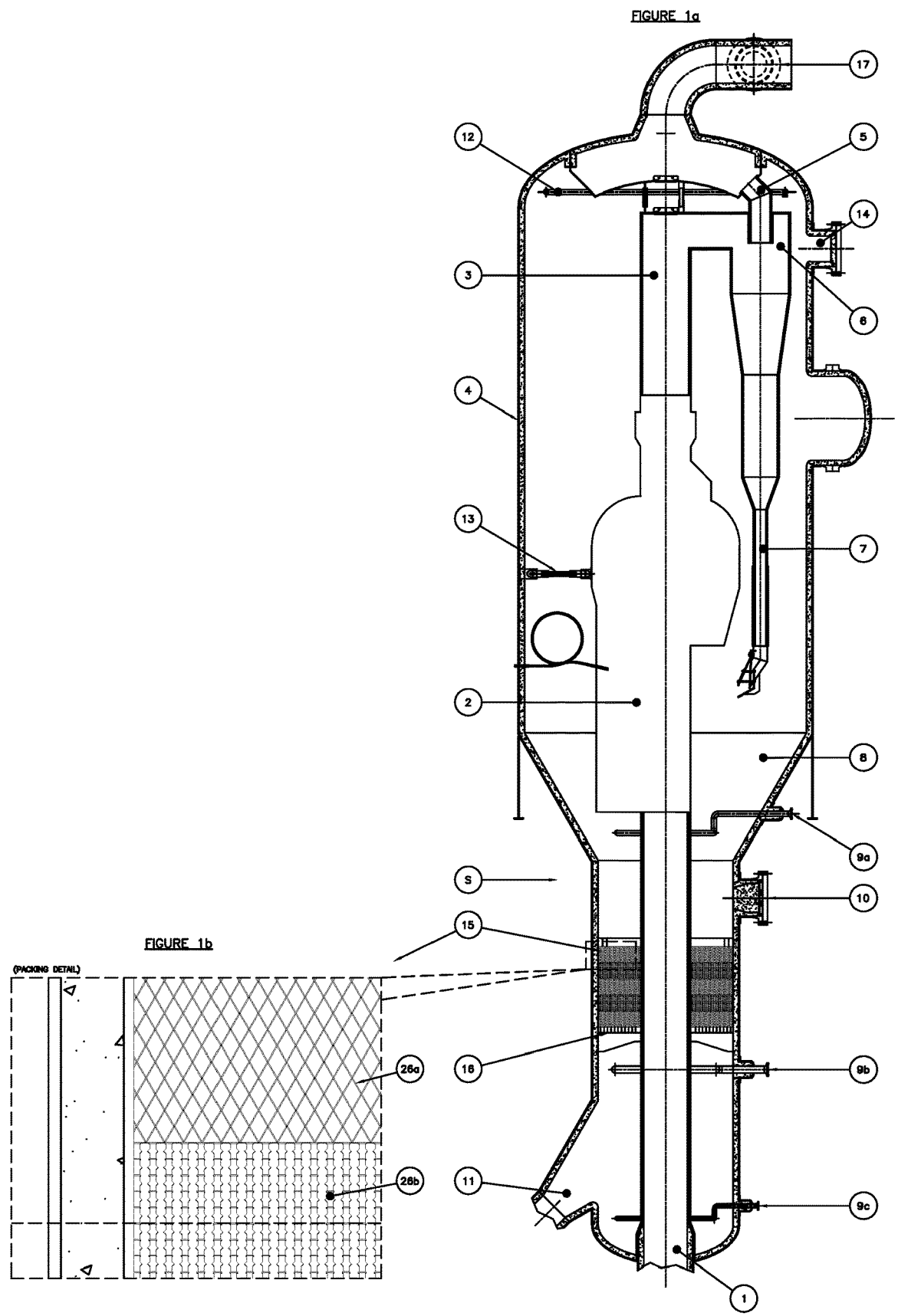

The present invention relates to a structured packing element. By "structured packing" is meant a juxtaposition of several unit elements, identical or not, arranged in an ordered manner. According to the invention, the structured packing unit element is in the shape of a substantially rectangular flat plate. In other words, the flat plate has a substantially parallelepipedal shape. By "flat plate" is meant a component the thickness of which is much less than the other dimensions of the plate. The plate is referred to as flat because it is not folded.

According to the invention, the flat plate comprises at least two slots intended for interlocking another packing element in an inclined manner with respect to the packing element considered. In other words, the slots make it possible to assemble two packing elements in an inclined manner with respect to one another. Thus, the structured packing can be assembled by interlocking, which makes it possible to facilitate placing and holding the packing elements in position for welding, or even to eliminate welds. In this way, assembling the structured packing becomes simple and rapid. The slots are openings formed in the flat plate, which open onto an edge of the flat plate. Preferably, the slots are provided for the insertion of the thickness of a packing element.

According to the invention, the flat plate comprises at least two recesses intended for forming channels within the structured packing. The recesses make it possible to facilitate the exchanges within the structured packing, in particular by increasing the specific surface area of the structured packing, to limit the effects of clogging, and preferential passages within the structured packing. The recesses are openings formed in the flat plate which open onto an edge of the flat plate.

According to the invention, the slots and the recesses are distributed over both lengths of the flat plate, symmetrically with respect to the longitudinal axis of the flat plate. In other words, slots and recesses are provided on either side of the flat plate, slots on one side of the flat plate facing other slots on the other side, and recesses on one side of the flat plate facing other recesses on the other side. This symmetry makes it possible to form an ordered and regular arrangement of the packing elements within the packing structure. Preferably, the slots and the recesses can be regularly distributed over the lengths of the flat plate.

The interlocking of the packing elements also has the advantage of making the structure modular, facilitating the choice of the shape of the packing structure, and also facilitating the maintenance and servicing of the packing structure. In fact, with these packing elements, it is possible to replace a single packing element independently of the remainder of the structure.

According to an embodiment example, the packing element can be made of metal. II can be shaped by machining, by moulding or by additive manufacturing.

According to an embodiment of the invention, the slots can be substantially rectangular, so as to facilitate the interlocking of two packing elements.

Alternatively, the recesses can have other shapes, for example triangular, polygonal, oblong, semi-circular, etc.

Advantageously, in order to ensure that the packing elements are held and placed in position during the construction of the structured packing, the slots can have a height substantially equal to the thickness of a packing element.

Advantageously, the slots can be produced by machining.

According to an aspect of the invention, the recesses can have a substantially triangular shape, the base of the triangle corresponding to the edge of a length of the flat plate. This triangular shape is simple to produce and makes it possible to form channels within the structured packing. In addition, the triangular shape makes it possible to increase the transfer surface area between the solid and the fluid or between the two fluids.

Alternatively, the recesses can have other shapes, for example rectangular, oblong, polygonal, semi-circular, etc.

Preferably, the recesses can be deeper than the slots.

Advantageously, the recesses can be produced by machining.

According to an implementation of the invention, the recesses can be placed between two slots. In other words, each length of the flat plate comprises alternating slots and recesses. Thus, within the structured packing, there is a channel between each packing element, which promotes the exchanges within the structured packing.

According to a characteristic of the invention, the length of a packing element (flat plate) can be comprised between 25 and 100 cm, preferably between 45 and 55 cm. Thus, the length of the packing element can define a dimension of the structured packing structure, which corresponds to the height of a layer of structured packing.

According to an aspect, the width of a packing element (flat plate) can be comprised between 3 and 15 cm, preferably between 5 and 10 cm. Thus, the spaces formed in the structured packing have suitable dimensions for promoting the exchanges between the two fluids or between a fluid and solids (for example catalyst).

According to an embodiment of the invention, the thickness of a packing element (flat plate) is comprised between 2 and 10 mm, preferably between 4 and 8 mm. This thickness allows an interlocking ensuring the putting into place and the holding in position of the packing elements with respect to one another.

According to an implementation of the invention, the distance separating two consecutive slots (and, if appropriate, between two consecutive recesses) is comprised between 1 and 50 cm, preferably between 10 and 30 cm. This distance makes it possible to guarantee a suitable space between the packing elements, for promoting the exchanges between two fluids or between a fluid and solids (for example catalyst).

According to an embodiment example, the depth of the slots is comprised between 3 and 100 mm, preferably between 10 and 50 mm. This depth allows a simple and strong interlocking of the packing elements.

Figure 2:
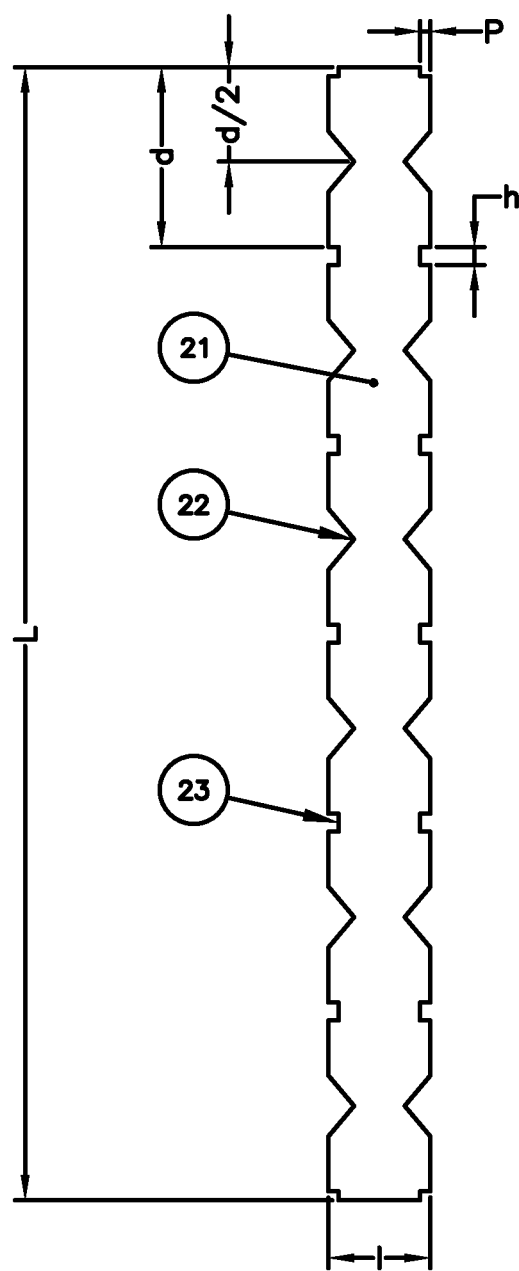
FIG. 2 represents a packing element according to an embodiment of the invention.

FIG. 2 shows, diagrammatically and non-limitatively, a packing element according to an embodiment of the invention. The packing element 21 has a substantially rectangular shape, of length L, of width l (the thickness, not shown, is less than the length L and the width l). The packing element 21 comprises, over both its lengths, a plurality of substantially rectangular slots 23, of height h and of depth p, the height h of which is substantially equal to the thickness (not shown) of the packing element. The slots are regularly distributed over both lengths of the packing element, and are spaced apart by a distance d. Moreover, the packing element comprises a plurality of substantially triangular recesses 22. The recesses 22 are arranged between the slots 23, substantially at half the distance d separating two slots. The dimensions L, l, h, d, and p are preferably selected from the ranges described above. According to a non-limitative embodiment example, the length L is 50 cm, the width l is 7 cm, the height h is 6 mm, the depth p is 8 mm and the distance d is 12 cm.

Packing Structure

In addition, the present invention relates to a packing structure forming a volume comprising an arrangement of packing elements according to any one of the combinations of the characteristics described above (geometric shapes, dimensions, arrangement of the slots and recesses, etc.). The arrangement comprises a first series of packing elements arranged in a first direction, and a second series of packing elements arranged in a second direction inclined with respect to said first direction, in such a way that the packing elements of the second series are interlocked in slots of the packing elements of the first series, and in such a way that the packing elements of the first series are interlocked in slots of the packing elements of the second series. Thus, the packing structure is constituted by a plurality of packing elements, intersecting in an inclined manner, and interlocked with respect to one another.

Thus assembled, the packing elements of the two series form a three-dimensional regular mesh delimiting channels for promoting the exchanges. The recesses of the packing elements increase the cross-section of the channels.

The first direction corresponds to the longitudinal axis of the packing elements of the first series, and the second direction corresponds to the longitudinal axis of the packing elements of the second series. The two directions are inclined within the packing.

According to an aspect of the invention, the angle of inclination between the first direction and the second direction is comprised between 10 and 90°, preferably between 30 and 90°. Such an inclination allows a lateral movement for the solid particles, which can consequently be mixed more thoroughly.

In the case where the first direction is substantially perpendicular to the second direction, within the structured packing, the transversal axes (i.e. according to the width of the packing elements) are aligned, and the azimutal axes (i.e. according to the thickness of the packing elements) are perpendicular with respect to one another.

Advantageously, the packing elements of the second series are identical to the packing elements of the first series.

Advantageously, in order to promote the interlocking of the packing elements, the slots of the packing elements of the first series can be inserted into the slots of the packing elements of the second series.

The interlocking by means of the slots makes it possible to have a stable and strong packing structure which is why, according to an embodiment, no additional positive connection of the packing elements is implemented. Thus, the assembly of the packing structure is facilitated.

Alternatively, in order to reinforce the stability and the strength of the packing structure, a positive connection of the structure is implemented by fixing the packing elements, for example by welding, by bonding, by screwing, by bolting, or any similar means. Preferably, the fixing is implemented by welding. Given the strength of the structure, fewer welds are necessary than for the packing structures according to the prior art, which facilitates its assembly.

According to an embodiment of the invention, and in order to facilitate the installation of the packing structure within a column, the volume of structured packing can substantially have the shape of an angular portion of a cylinder (i.e. substantially the shape of a portion of camembert).

According to an aspect of the invention, the volume of the packing structure can have a height comprised between 10 and 200 cm, preferably between 15 and 150 cm, more preferably between 20 and 100 cm, and very preferably between 20 and 50 cm. This dimension allows an insertion of the packing structure into the column. In addition, this dimension corresponds substantially to the length of a packing element.

Figure 3:
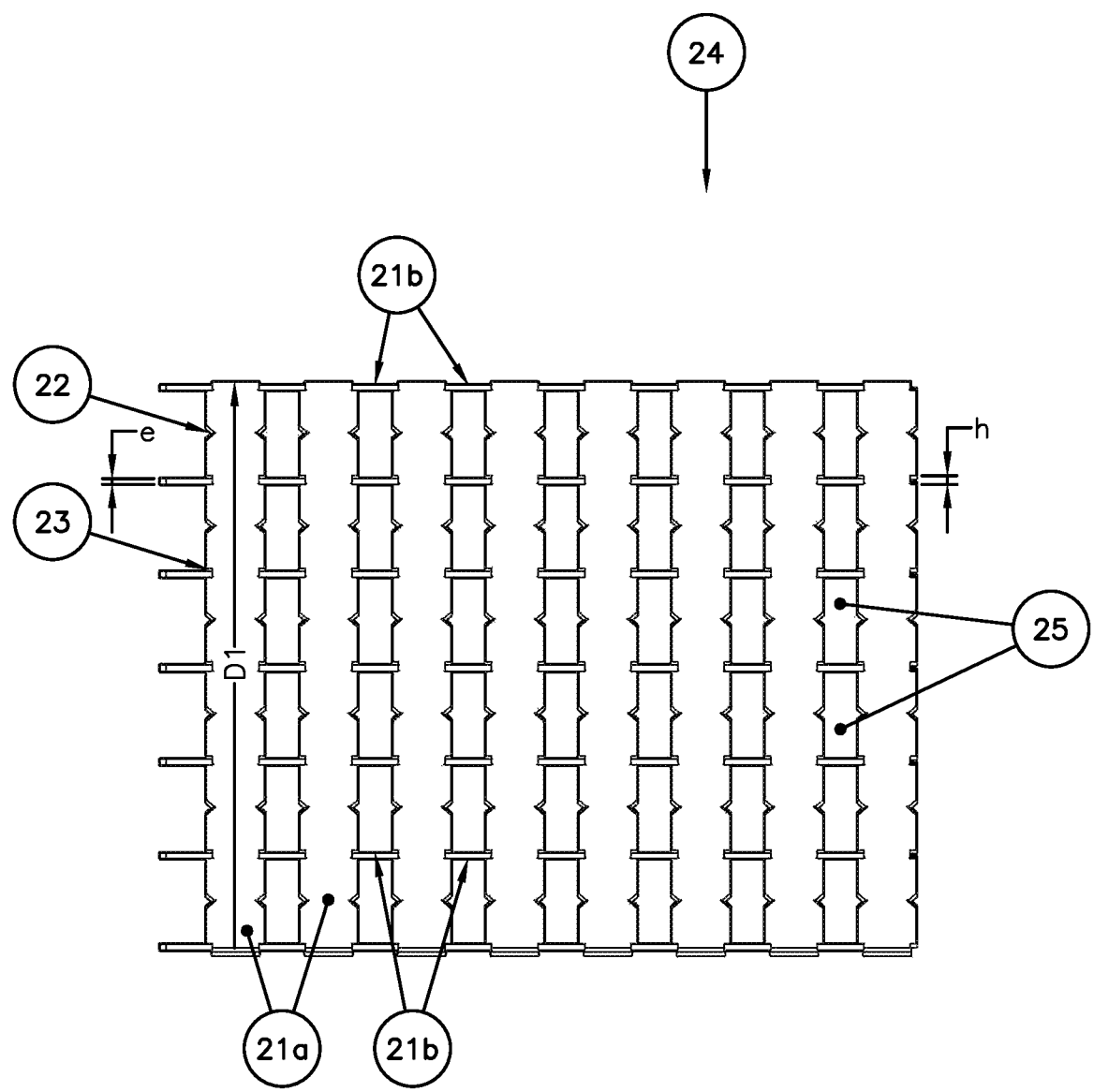
FIG. 3 represents a plan view of a packing structure according to an embodiment of the invention.
Figure 4:
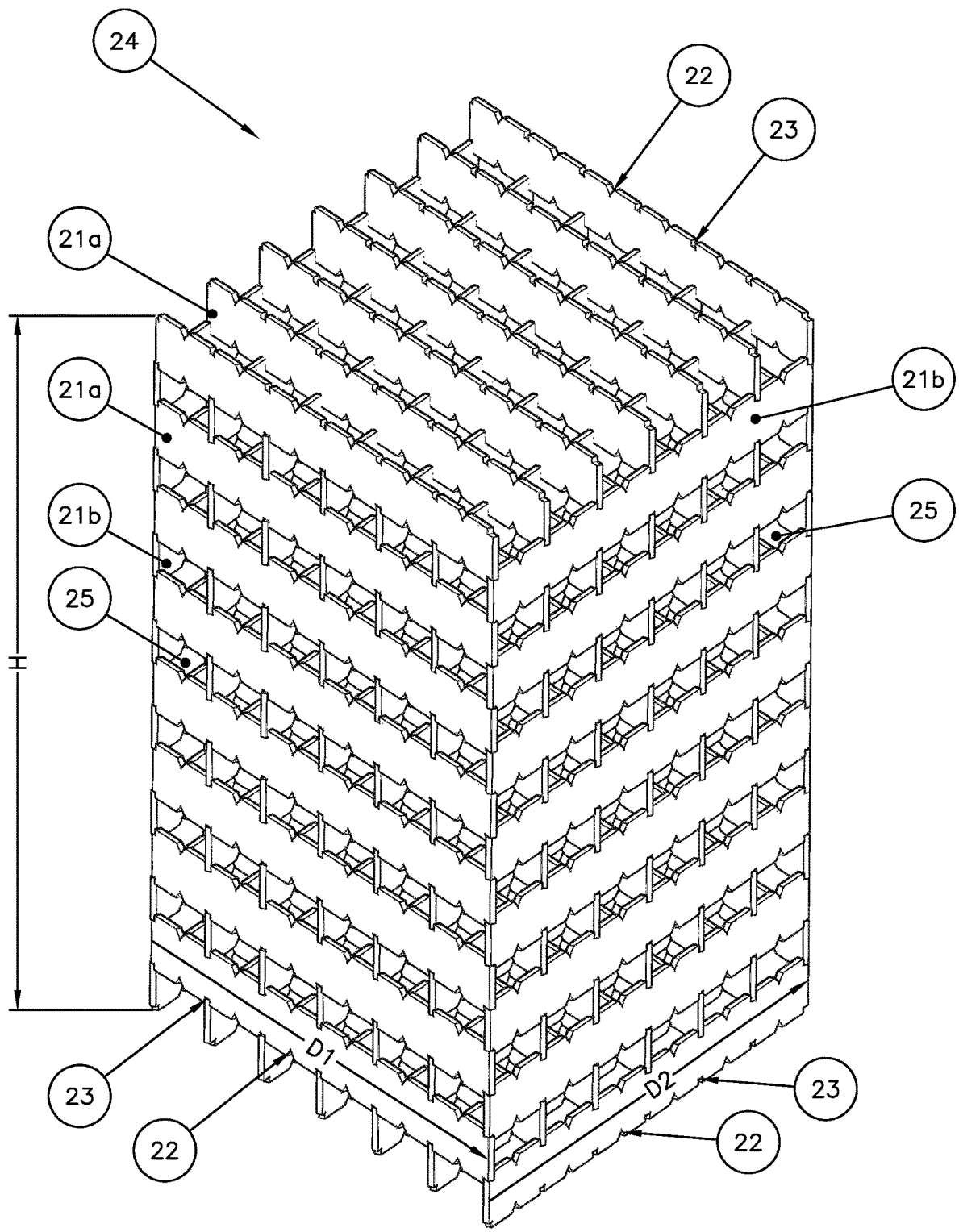
FIG. 4 represents a three-dimensional view of a packing structure according to an embodiment of the invention.

FIGS. 3 and 4 represent, diagrammatically and non-limitatively, a packing structure according to an embodiment of the invention. FIG. 3 is a side view of the packing structure 24, and FIG. 4 is three-dimensional view of the packing structure 24. The packing structure comprises a plurality of packing elements 21 provided with slots 23 and recesses 22. In the case of the example shown, the packing elements 21 correspond to the packing elements shown in FIG. 2. The packing structure comprises a first series of packing elements 21a oriented in a first direction D1 (the direction D1 is vertical in FIG. 3 and horizontal in FIG. 4), and a second series of packing elements 21b oriented in a second direction D2 (the direction D2 is perpendicular to the plane of FIG. 3 and is horizontal in FIG. 4). The direction D2 is orthogonal to the direction D1. In addition, the transversal axes (i.e. according to the width of the packing elements) are aligned, and the azimutal axes (i.e. according to the thickness of the packing elements) are perpendicular. In the case of the embodiment shown, the slots 23 of the packing elements 21a of the first series are interlocked in the slots 23 of the packing elements 21b of the second series, and vice-versa. In addition, the height h of the slots 23 is substantially equal to the thickness e of the packing elements. Thus assembled, the packing elements 21a and 21b form a three-dimensional mesh delimiting channels 25 for promoting the exchanges. The recesses 23 of the packing elements 21a and 21b increase the cross-section of the channels 25.

In the case of the embodiment shown, the angle of inclination of the first direction D1 with respect to the second direction D2 is 90° (orthogonality). Alternatively, this angle of inclination could be comprised between 10 and 90°, preferably between 30 and 90°.

Uses

Moreover, the present invention relates to a use of a packing structure according to any combination of the characteristics described previously for bringing a gas into contact with a catalyst, in particular for a stripping operation of a catalyst, for example for an FCC, NCC, DCC, HS-FCC, MTO, MTG process or any similar process.

During this stripping operation of the catalyst, all or part of the hydrocarbons which have penetrated the high porosity of the catalyst or which are adsorbed on its surface are removed. That makes it possible to reduce and better control the temperature at the regenerator (operation after stripping), and to improve the recovery of upgradable products originating from cracking. This operation is carried out in a stripper in which a gas, generally steam, is circulated in counter-current to the flow of catalyst. Said gas becomes loaded with gaseous hydrocarbons thus removed from the surface or the porosity of the catalyst. The efficiency of this operation is increased by the addition of packing in the stripping zone.

The packing is arranged in the lower part of the stripper in the dense phase so as to reduce the entrainments of solid particles towards the dilute phase.

In a fluidized-bed catalytic unit, the packing according to the invention has the advantage of ensuring a good distribution of the catalyst in the stripping zone and of having a good efficiency of contact between the spent catalyst and the stripping fluid.

For this use, the stripping chamber can comprise:
  a system for the separation of the catalyst and the cracked gases,
  a cyclone for separating a fraction of catalyst,
  a packing as described previously for bringing the catalyst into contact with a gas with the aim of removing the hydrocarbons that have penetrated or been adsorbed by the catalyst, and
  at least one gas insertion pipe for distributing the gas over the packing.

FIG. 1a shows, diagrammatically and non-limitatively, a general view of a stripper S including a packing structure according to an embodiment of the invention. This figure shows the top part of the riser reactor 1 which opens into a separation system 2 making it possible to separate the catalyst and the cracked gases. Said system can be of any type known to a person skilled in the art. The cracked gases are sent via the pipe 3 into the cyclone 6 and leave the disengaging vessel 4, situated above the stripping zone of the stripper S, via the pipes 5 and 17.

An additional fraction of catalyst is separated in the cyclone 6 and sent into the dipleg 7 in order to arrive in the dense catalyst bed 8 situated a little lower, above the packing 15. The packing 15 is obtained by superimposition of several structured packing layers as described previously. The packing 15 is held in the stripper S via grids or supports 16. The catalyst is stripped by the steam admitted via the ducts 9a, 9b and 9c then sent to the regenerator (not shown) via the pipe 11. The optional element 12 allows an injection of steam at the top of the stripper in order to discourage the formation of coke. The element 13 is a guide making it possible to keep the separation system 2 away from the wall of the disengaging vessel 4.

FIG. 1b shows, diagrammatically and non-limitatively, a more detailed view of the packing 15 of FIG. 1a. The packing 15 comprises at least two packing layers 26a and 26b oriented differently in order to optimize the exchanges. In addition, in the packing layer 26a, the angle of inclination of the first direction with respect to the second inclination is substantially 60°. In the packing layer 26b, the angle of inclination of the first direction with respect to the second inclination is substantially 90°.

The structured packing according to the invention is also used for bringing fluids, for example a gas and a liquid, into contact, in particular in the field of gas treatment, distillation, acid gas capture, dehydration or air separation.

Manufacturing Process

The present invention also relates to a manufacturing process of a packing structure, in which the following steps are carried out:

a) manufacturing a plurality of packing elements according to any one of the combinations of characteristics previously described, for example by machining, by moulding or by additive manufacturing;
b) constructing an arrangement of the packing elements by means of the following steps:
  i) positioning at least two packing elements of a first series of packing elements in a first direction;
  ii) interlocking at least two packing elements of a second series of packing elements in a second direction inclined with respect to the first direction within the slots of the packing elements of the first series;
  iii) interlocking at least two packing elements of a first series of packing elements according to the first direction within the slots of the packing elements of the second series; and
  iv) repeating steps ii) and iii) in order to form the desired volume.

Thus assembled, the packing elements of the two series form a three-dimensional mesh delimiting channels for promoting the exchanges. The recesses of the packing elements increase the cross-section of the channels.

The first direction corresponds to the longitudinal axis of the packing elements of the first series, and the second direction corresponds to the longitudinal axis of the packing elements of the second series. The two directions are inclined with respect to one another within the packing (at an angle comprised between 10 and 90°, preferably between 30 and) 90°.

In the case where the first direction is substantially perpendicular to the second direction, within the structured packing, the transversal axes (i.e. according to the width of the packing elements) are aligned, and the azimutal axes (i.e. according to the thickness of the packing elements) are perpendicular.

According to an embodiment of the invention, the manufacturing process comprises no step of fixing the packing elements together. In fact, the interlocking by means of the slots makes it possible to have a stable and strong packing structure. Thus, the assembly of the packing structure is facilitated.

As a variant, the manufacturing process comprises a step of fixing the packing elements together, in particular by welding, bonding, screwing, bolting or any similar means. Preferably, the positive connection is implemented by welding. Given the strength of the structure, fewer welds are necessary than for the packing structures according to the prior art, which facilitates its assembly.

According to an implementation of the invention, the manufacturing process comprises a step of cutting the packing structure to the desired shape, in particular according to an angular portion of a cylinder (i.e. substantially the shape of a portion of camembert). Thus, the insertion of the packing into a column is facilitated, as well as its assembly.

The invention claimed is:

1. A structured packing element having the shape of a substantially rectangular flat plate, wherein the packing element comprises at least two slots for interlocking two packing elements inclined with respect to one another, and at least two recesses extending completely through a thickness of the flat plate and opening onto an edge of the flat plate for forming channels within the structured packing, the slots and the recesses being distributed over both edges of the flat plate symmetrically with respect to the longitudinal axis of the flat plate.

2. The structured packing element according to claim 1, in which the slots are substantially rectangular.

3. The structured packing element according to claim 1, in which the slots have a height (h) substantially equal to the thickness (e) of the flat plate.

4. The structured packing element according to claim 1, in which the recesses are substantially triangular.

5. The structured packing according to claim 1, in which each recess is arranged between two slots.

6. The structured packing according to claim 1, in which the length (L) of the flat plate is between 25 and 100 cm.

7. The structured packing according to claim 1, in which the width (l) of the flat plate is between 3 and 15 cm.

8. The structured packing according to claim 1, in which the thickness Lei of the flat plate is between 2 and 10 mm.

9. The structured packing element according to claim 1, in which the distance (d) between two consecutive slots is between 1 and 50 cm.

10. A packing structure forming a volume comprising an arrangement of packing elements according to claim 1, wherein the arrangement comprises a first series of packing elements arranged in a first direction (D1), and a second series of packing elements arranged in a second direction (D2) inclined with respect to the first direction (D1), in such a way that the packing elements of the second series are interlocked in slots of the packing elements of the first series, and in such a way that the packing elements of the first series are interlocked in slots of the packing elements of the second series.

11. The packing structure according to claim 10, in which the packing elements of the first and second series are fixed together, by welding, bonding, screwing or bolting.

12. The packing structure according to claim 10, in which the volume of structured packing has substantially the shape of an angular portion of a cylinder.

13. The packing structure according to claim 10, in which the volume of structured packing has a height (H) between 10 and 200 cm.

14. The packing structure according to claim 10, in which the angle formed between the first direction (D1) and the second direction (D)2 is between 10 and 90°.

15. Use of a packing structure according to claim 10 for bringing a gas into contact with a catalyst, in particular for a stripping operation of the catalyst.

16. A process for manufacturing a packing structure, in which the following steps are carried out:
  a) manufacturing a plurality of packing elements according to claim 1;
  b) constructing an arrangement of the packing elements by means of the following steps:
    i) positioning at least two packing elements of a first series of packing elements in a first direction (D1);
    ii) interlocking at least two packing elements of a second series of packing elements in a second direction (D2) inclined with respect to the first direction (D1) within the slots of the packing elements of the first series;
    iii) interlocking at least two packing elements of a first series of packing elements in the first direction (D1) within the slots of the packing elements of the second series; and
    iv) repeating steps ii) and iii) in order to form the desired volume.

17. The process according to claim 16, in which the manufacturing process comprises a step of fixing the packing elements, preferably by welding, by bonding, by screwing or by bolting.

18. The process according to claim 16, in which the manufacturing process comprises a step of cutting the volume of structured packing in order to form an angular portion of a cylinder.

19. A method for stripping a catalyst of hydrocarbons penetrated into or adsorbed on a surface of the catalyst, comprising bringing a gas into contact with the catalyst in the packing structure according to claim 10.

20. The structured packing element according to claim 1, in which the length (L) of the flat plate is between 45 and 55 cm, the width (l) of the flat plate is between 5 and 10 cm, the thickness (e) of the flat plate is between 4 and 8 mm, and the distance (d) between two consecutive slots is between 10 and 30 cm.

* * * * *